(12) United States Patent
Asghar et al.

(10) Patent No.: US 12,294,532 B2
(45) Date of Patent: *May 6, 2025

(54) STRETCHED EPG AND MICRO-SEGMENTATION IN MULTISITE FABRICS

(71) Applicant: Cisco Technology, Inc., San Jose, CA (US)

(72) Inventors: Javed Asghar, Dublin, CA (US); Sridhar Vallepalli, Fremont, CA (US); Umamaheswararao Karyampudi, Fremont, CA (US); Srinivas Kotamraju, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/623,693

(22) Filed: Apr. 1, 2024

(65) Prior Publication Data

US 2024/0244012 A1 Jul. 18, 2024

Related U.S. Application Data

(60) Continuation of application No. 17/448,320, filed on Sep. 21, 2021, now Pat. No. 11,949,602, which is a
(Continued)

(51) Int. Cl.
*H04L 12/00* (2006.01)
*H04L 9/40* (2022.01)
(Continued)

(52) U.S. Cl.
CPC .......... *H04L 49/104* (2013.01); *H04L 12/462* (2013.01); *H04L 12/4633* (2013.01);
(Continued)

(58) Field of Classification Search
CPC . H04L 49/104; H04L 12/462; H04L 12/4633; H04L 41/0893; H04L 45/04;
(Continued)

(56) References Cited

U.S. PATENT DOCUMENTS

2010/0043068 A1* 2/2010 Varadhan ................ H04L 45/50
726/15
2015/0124823 A1* 5/2015 Pani .................... H04L 41/0836
370/392
(Continued)

FOREIGN PATENT DOCUMENTS

EP 2154834 A1 * 2/2010 ......... H04L 12/4633

*Primary Examiner* — Lakeram Jangbahadur
(74) *Attorney, Agent, or Firm* — Patterson + Sheridan, LLP (57) ABSTRACT

An endpoint group (EPG) can be stretched between the sites so that endpoints at different sites can be assigned to the same stretched EPG. Because the sites can use different bridge domains when establishing the stretched EPGs, the first time a site transmits a packet to an endpoint in a different site, the site learns or discovers a path to the destination endpoint. The site can use BGP to identify the site with the host and use a multicast tunnel to reach the site. A unicast tunnel can be used to transmit future packets to the destination endpoint. Additionally, a stretched EPG can be segmented to form a micro-stretched EPG. Filtering criteria can be used to identify a subset of the endpoints in the stretched EPG that are then assigned to the micro-stretched EPG, which can have different policies than the stretched EPG.

14 Claims, 9 Drawing Sheets

Related U.S. Application Data division of application No. 16/162,199, filed on Oct. 16, 2018, now Pat. No. 11,159,451.

(60) Provisional application No. 62/694,349, filed on Jul. 5, 2018.

(51) Int. Cl.
| | |
|---|---|
| *H04L 12/46* | (2006.01) |
| *H04L 41/0893* | (2022.01) |
| *H04L 45/02* | (2022.01) |
| *H04L 45/16* | (2022.01) |
| *H04L 45/24* | (2022.01) |
| *H04L 45/74* | (2022.01) |
| *H04L 49/104* | (2022.01) |
| *H04L 49/15* | (2022.01) |
| *H04L 49/201* | (2022.01) |
| *H04L 61/106* | (2022.01) |
| *H04L 69/22* | (2022.01) |

(52) U.S. Cl.
CPC ......... *H04L 41/0893* (2013.01); *H04L 45/04* (2013.01); *H04L 45/16* (2013.01); *H04L 45/24* (2013.01); *H04L 45/74* (2013.01); *H04L 49/1553* (2013.01); *H04L 49/203* (2013.01); *H04L 61/106* (2013.01); *H04L 63/20* (2013.01); *H04L 69/22* (2013.01)

(58) Field of Classification Search
CPC ......... H04L 45/16; H04L 45/24; H04L 45/74; H04L 49/1553; H04L 49/203; H04L 61/106; H04L 63/20; H04L 69/22; H04L 63/0272

See application file for complete search history.

(56) References Cited

U.S. PATENT DOCUMENTS

2017/0034057 A1* 2/2017 Kapadia ................ H04L 45/745
2017/0339188 A1* 11/2017 Jain ........................ G06F 9/455

* cited by examiner

STRETCHED EPG AND MICRO-SEGMENTATION IN MULTISITE FABRICS

CROSS-REFERENCE TO RELATED APPLICATIONS

This application is a continuation of U.S. divisional patent application Ser. No. 17/448,320 filed Sep. 21, 2021, which is a divisional of U.S. patent application Ser. No. 16/162,199 filed Oct. 16, 2018, which issued on Oct. 26, 2021 as U.S. Pat. No. 11,159,451, which claims benefit of U.S. provisional patent application Ser. No. 62/694,349 filed Jul. 5, 2018. The aforementioned related patent applications are herein incorporated by reference in their entirety.

TECHNICAL FIELD

Embodiments presented in this disclosure generally relate to stretching endpoint group or security groups between switching fabrics at multiple sites.

BACKGROUND

Datacenter fabrics can be deployed with a local-site controller managing a set of switches using various types of architectures. This single instance of a fabric (and the hosts and applications coupled to the fabrics) is referred herein as a site. However, the size of the site (e.g., the number of switches in the site) is often limited by the capacity of the network domains in the site as well as the risk that the site is a single point of failure. Today, datacenter administrators create multiple sites which each have independent switching fabrics to enlarge capacity and provide redundancy to avoid a single point of failure. While doing so helps to mitigate these issues, creating independent sites does not provide uniform network connectivity and policy across such fabrics. As a result, transmitting data between the sites (e.g., multi-site traffic) is difficult to manage.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment herein is a unified fabric that includes a first switching fabric at a first site, a second switching fabric at a second site where the first site is at a different geographic location than the second site, wherein the first switching fabric and the second switching fabric are communicatively coupled via a public network, and a multi-site controller. The multi-site controller is configured to create a stretched EPG extending between the first and second sites and containing at least a first endpoint in the first site and a second endpoint in the second site where the stretched EPG defines a security policy shared by the first and second endpoints, identify a subset of endpoints in the stretched EPG using a filtering criteria, and create a micro-stretched EPG from the subset of endpoints, wherein the micro-stretched EPG extends between the first and second sites and wherein the subset of endpoints are removed from the stretched EPG.

Another embodiment herein is a method (or non-transitory computer readable medium) that includes creating a stretched EPG extending between a first switching fabric at a first site and a second switching fabric at a second site and containing at least a first endpoint in the first site and a second endpoint in the second site, where the stretched EPG defines a security policy shared by the first and second endpoints, and the first switching fabric and the second switching fabric are communicatively coupled via a public network. The method also includes identifying a subset of endpoints in the stretched EPG using a filtering criteria and creating a micro-stretched EPG from the subset of endpoints, wherein the micro-stretched EPG extends between the first and second sites and wherein the subset of endpoints is removed from the stretched EPG.

Example Embodiments

Embodiments herein describe using translation mappings and security contracts to establish interconnects and policies between switching fabrics at different sites to create a unified fabric. In one embodiment, a multi-site controller can stretch endpoint groups (EPGs) between the sites so that a host or application in a first site can communicate with a host or application in a second site that is assigned to the same stretched EPG, despite the two sites have different namespaces (e.g., different values for Virtual Routing and Forwarding (VRF) instances, Bridge Domains (BD), subnets, or EPGs). Each site can store namespace translation mappings that enable the site to convert namespace information in packets received from a different site into its own namespace values. As a result, independent bridging and routing segments in the various sites can be interconnected as well as providing application accessibility (by using the EPGs) across different fabrics that have independent and private namespaces.

Because the sites can use different bridge domains or subnets when establishing the stretched EPGs, the first time a site transmits a packet to an endpoint in a different site but in the same stretched EPG, the site learns a path to the destination endpoint. That is, the sites may not initially know how to communicate with endpoints that are in the same stretched EPGs but located in different sites. The origination site can use border gateway protocol (BGP) to identify the destination site containing the destination endpoint and then use a multicast tunnel to reach the destination site. Once the location of the destination endpoint is identified, the origination site can then use a unicast tunnel to transmit future packets to the destination.

The embodiments herein also describe techniques for segmenting a stretched EPG to form a micro-stretched EPG. A system administrator can provide filtering criteria (e.g., a type of operating system, virtual machine, hypervisor, etc.) for identifying a subset of the endpoints in the stretched EPG. This subset can be removed from the stretched EPG and placed in the micro-stretched EPG. The micro-stretched EPG may be assigned different policies than the stretched EPG, such as stricter security policies.

Figure 1:
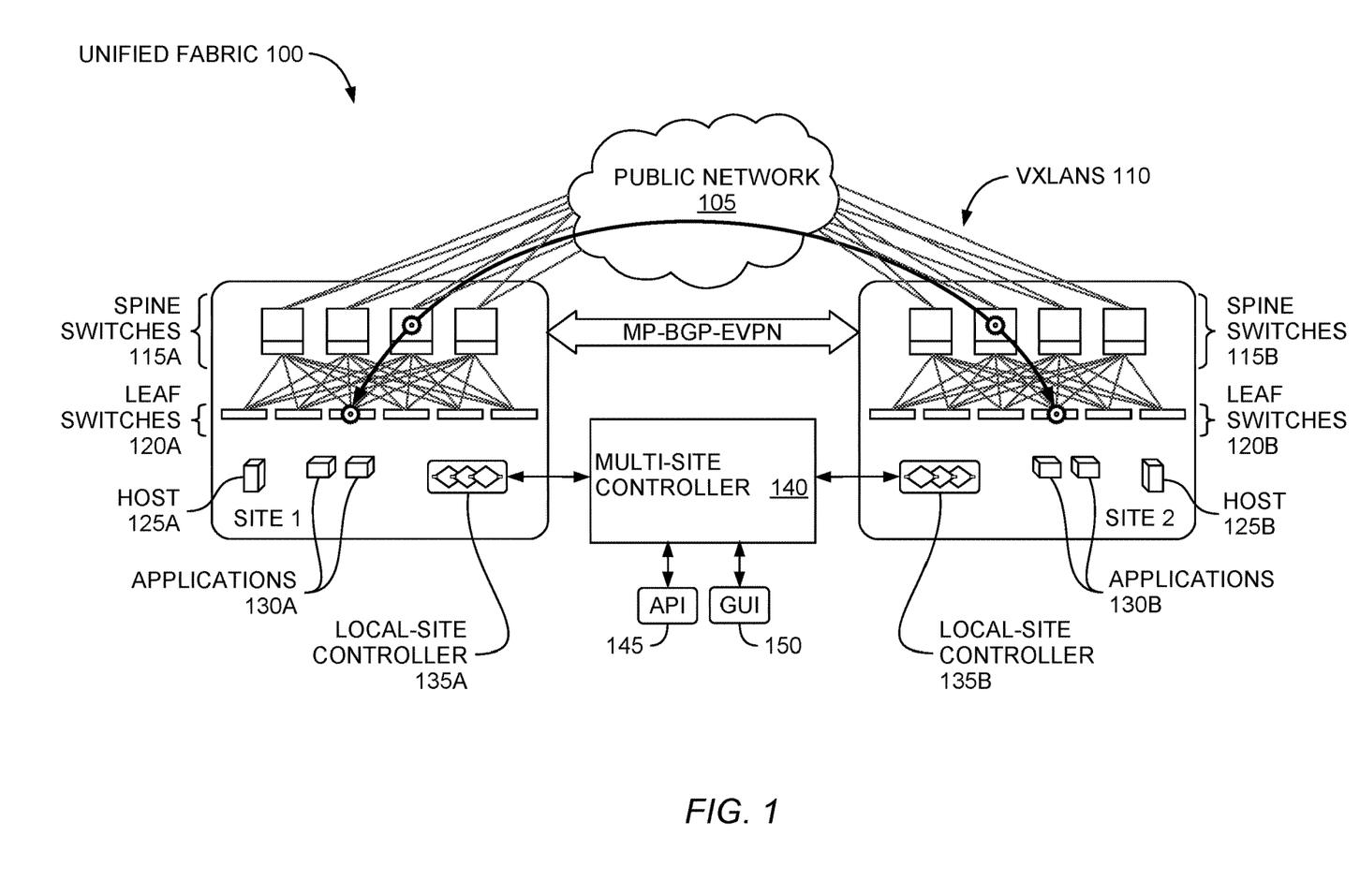
FIG. 1 illustrates a unified fabric including multiple sites, according to one embodiment described herein.

FIG. 1 illustrates a unified fabric 100 including multiple sites, according to one embodiment described herein. As shown, the fabric 100 includes Site 1 and Site 2 which each have respective switching fabrics formed by spine switches 115 and leaf switches 120. In this example, the leaf switches 120 are communicatively coupled to hosts 125 and applications 130. That is, the hosts 125 and applications 130 use the spine and leaf switches 115, 120 to communicate with other hosts and applications in the same site, hosts and applications in different sites, and entities that are outside of the fabric 100. In one embodiment, the hosts 125 and applications 130 are assigned to an EPG which permits these hosts 125 and applications 130 to communicate with each other. Put differently, the EPG assignments can be used to control traffic flow and provide security between the different hosts 125 and applications 130. For example, the host 125A may be unable to communicate with the applications 130A unless these entities are in the same EPG or there is a security policy (also referred to herein as a security contract) that permits the EGPs to which the host 125A and applications 130A are assigned to communicate. As such, the EPGs can be any kind of grouping of endpoints that controls the manner in which the hosts 125 and applications 130 can communicate with each other. In one embodiment, EPGs (which can also be referred to as security groups) are a collection of similar endpoints representing an application tier or set of services. The endpoints can include the hosts 125 and applications 130 as well as virtual machines, hypervisors, containers, physical servers, etc. Many different types of endpoints can be assigned to the same EPG to perform a common service. In one embodiment, different policies are assigned to different EPGs in the fabric 100. For example, depending on which EPG an endpoint is assigned can determine the security policy, Quality of Service (QoS), service chain policy, and routing policy for that endpoint.

While FIG. 1 illustrates using a spine-leaf architecture to form the individual fabrics in the sites, this is not a requirement. The switches can be organized in any arrangement and benefit from the embodiments described herein. In one embodiment, the switches 115, 120 in the Sites 1 and 2 can be used to facilitate communication between physical servers or data storage elements in two datacenters (e.g., a datacenter in the U.S. and a datacenter in Europe). In another example, the switches 115, 120 may also be deployed to facilitate communication in a physical or virtual cloud. For example, Sites 1 and 2 may be different regions of the same cloud infrastructure.

Site 1 and Site 2 include a respective local-site controller 135 that establishes a namespace for the respective site. In one embodiment, local-site controllers 135 (which can be implemented using software, hardware, or combinations thereof) can set up the namespaces independently from the namespaces in the other sites. Put differently, the namespaces in the sites are private. As a result, the namespace in Site 1 and the namespace in Site 2 may conflict or overlap. For example, when assigning values to the BDs in Site 1, the local-site controller 135A can use the same IP address that the local-site controller 135B assigns to a BD in Site 2. For instance, the same set of IP addresses, software security indexes, or network segment indexes can be re-used by the local-site controllers 135 when establishing their private namespaces. This becomes a problem when the host 125A and applications 130A in Site 1 attempt to send packets to the host 125B and applications 130B in Site 2 since the source identifiers (e.g., the IP address for the VRF instance, BD, or subnet, and the Class ID for the EPGs) in the packets can be assigned to multiple entities (e.g., a BD in Site 2 may have the same IP address as a BD in Site 1). As discussed in detail below, a multi-site controller 140 (which can be software, hardware, or combinations thereof) provides namespace translation mappings that permit each site to translate the namespace specific information in a received packet to a corresponding value in its own namespace. In this manner, the sites can have private namespaces that conflict and still permit the hosts 125 and applications 130 in different sites to communicate using Layer 2 traffic.

In FIG. 1, the unified fabric 100 uses a public network 105 (e.g., the Internet) to facilitate traffic flow between the fabrics of Site 1 and Site 2 which may be located large distances from each other. The sites can use VXLANs 110 to transmit data into the public network 105 which then routes the data to one of the spine switches 115 in the other site where the packet is then routed to the leaf switch 120 coupled to the destination host 125 or application 130. Although FIG. 1 illustrates two sites, the unified fabric 100 can include any number of sites that each has its own independent fabric and namespace.

The multi-site controller 140 communicates with the local-site controllers 135 in each of the sites. The multi-site controller 140 can use the local-site controllers 135 to identify the namespaces, provide the namespace translation mappings, change the EPG assignments of the hosts 125 and applications 130, establish security contracts between the EPGs, and the like. To receive instructions from a system administrator, the multi-site controller 140 is coupled to an API 145 and GUI 150. Using one or both of these components, the system administrator can establish security policies and perform workload deployment across the different fabrics without having to individually configure each site in the fabric 100. Instead, the multi-site controller 140 receives the request from the system administrator and uses the embodiments described below to carry out the request by communicating with the local-site controllers 135. Thus, to the perspective of the system administrator, the API 145 and GUI 150 provide a "single pane of glass" that can be used to control the sites as a whole.

Figure 2:
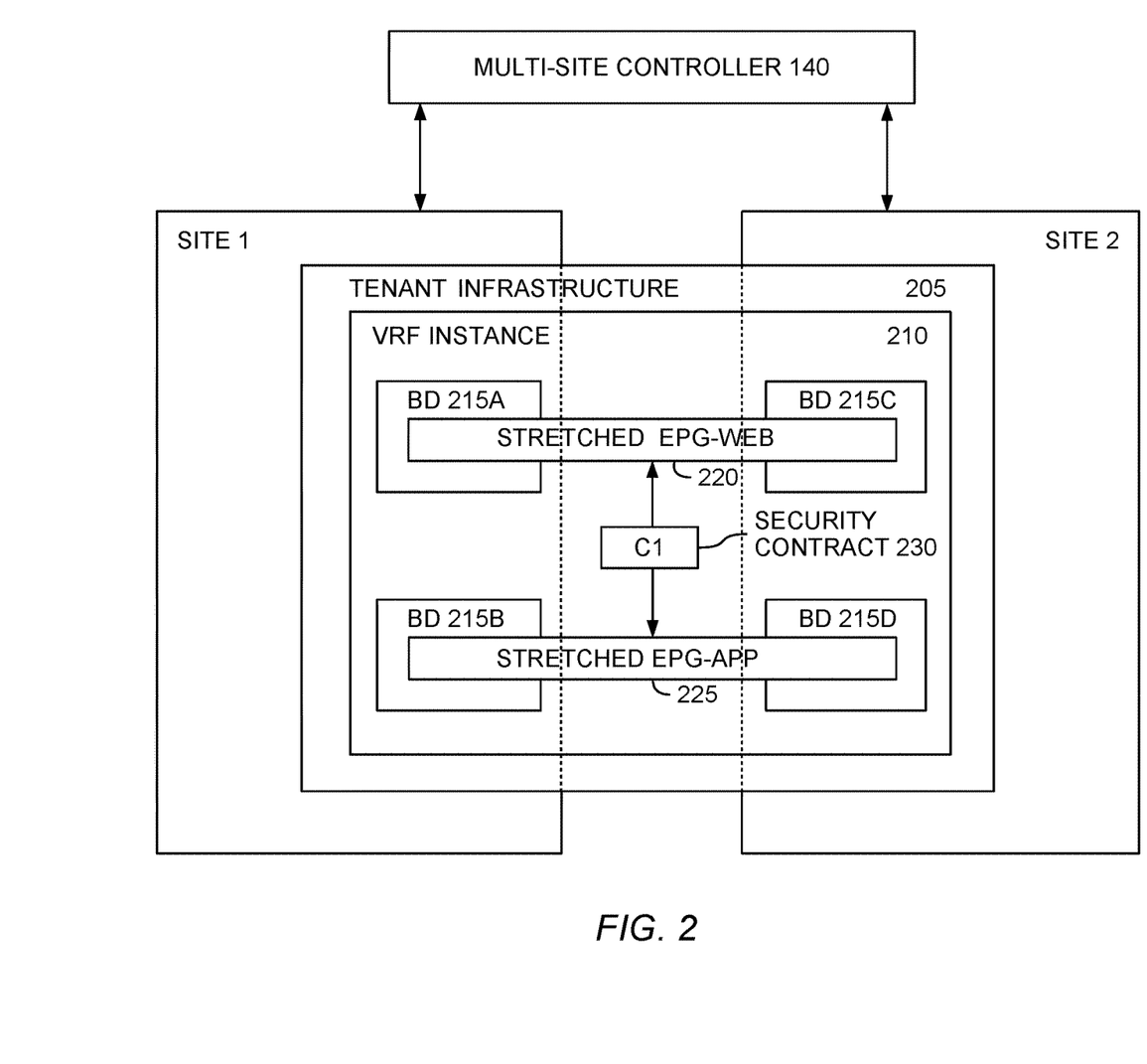
FIG. 2 illustrates a unified fabric including endpoint groups stretched between sites, according to one embodiment described herein.

FIG. 2 illustrates a unified fabric including EPGs stretched between sites, according to one embodiment described herein. FIG. 2 illustrates stretching the Web-EPG 220 and the App-EPG 225 to include both Site 1 and Site 2. Thus, host and applications in the different sites can now be assigned to the same EPG where previously a host or site could only be assigned to an EPG in the particular site. Using the deployment in FIG. 2, a service can use hosts and applications on different sites. For example, the Web-EPG can use hosts and applications in both sites to perform a service—e.g., establish a web server. Thus, a portion of the service can be performed by endpoints at Site 1 while other portions of the service are performed by endpoints at Site 2.

In one embodiment, the multi-site controller 140 configures the sites so that there is uniform availability of VRF, BD (or subnet), and EPG across the sites. In order to achieve uniform availability, the multi-site controller 140 creates config objects such as namespace translation mappings that permit the hosts and applications at different sites but that are in the same EPG to communicate.

As shown, a tenant infrastructure 205 is stretched across the sites. The tenant infrastructure 205 can be a logical container for application policies or shared resource requirements. For example, each customer that uses the underlying datacenter or cloud can have their own tenant infrastructure that establishes their desired policies. As such, the unified fabric can include multiple tenant infrastructures 205.

The tenant infrastructure 205 includes a VRF instance 210 (or a VRF object) that is a Layer 3 forwarding and application policy domain which defines a L3 address domain. Although one VRF instance 210 is shown, the tenant infrastructure 205 can include any number of VRF instances 210.

The VRF instance 210 includes BD 215A, BD 215B, BD 215C, and BD 215D which each may be associated with one or more subnets. The BDs 215 define a Layer 2 MAC address space and Layer 2 flood domain if such flooding is enabled. While the VRF instance 210 defines a unique IP address space, in one embodiment that address space can include multiple subnets which are referenced in the BDs 215. In this example, each of the EPGs is assigned to multiple BDs 215—i.e., the Web-EPG 220 is in the BD 215A at Site 1 but in the BD 215C at Site 2. The App-EPG 225 is in BD 215B at Site 1 but in the BD 215D at Site 2. Because the stretched EPGs 220, 225 are in different BDs 215 at the different sites, the unified fabric may perform a learning process to identify routes between the endpoints at one site to the endpoints at the other site even though these endpoints are part of the same stretched EPG.

In FIG. 2, the multi-site controller 140 has established a security contract 230 (labeled C1) between the Web-EPG 220 and the App-EPG 225. This permits the underlying resources and endpoints in the datacenter or cloud infrastructure assigned to the Web-EPG 220 and App-EPG 225 to communicate via the unified fabric. For example, the endpoints in the Web-EPG 220 can establish a web server while the endpoints in the App-EPG 225 establish a database. Because of the security contract 230, the endpoints assigned to the Web-EPG 220 can communicate with the endpoints in the App-EPG 225 using the unified fabric, and vice versa. Thus, the VRF instance 210 permits a host or application in Site 1 to communicate with a host or application in Site 2 if these entities are assigned to the same EPG or if the entities are assigned to different EPGs (either the Web-EPG or the APP-EPG). However, if the security contract 230 was not there, only the endpoints assigned to the same EPG would be able to communicate with each other, regardless whether those endpoints were in the same site or different sites.

Figure 3:
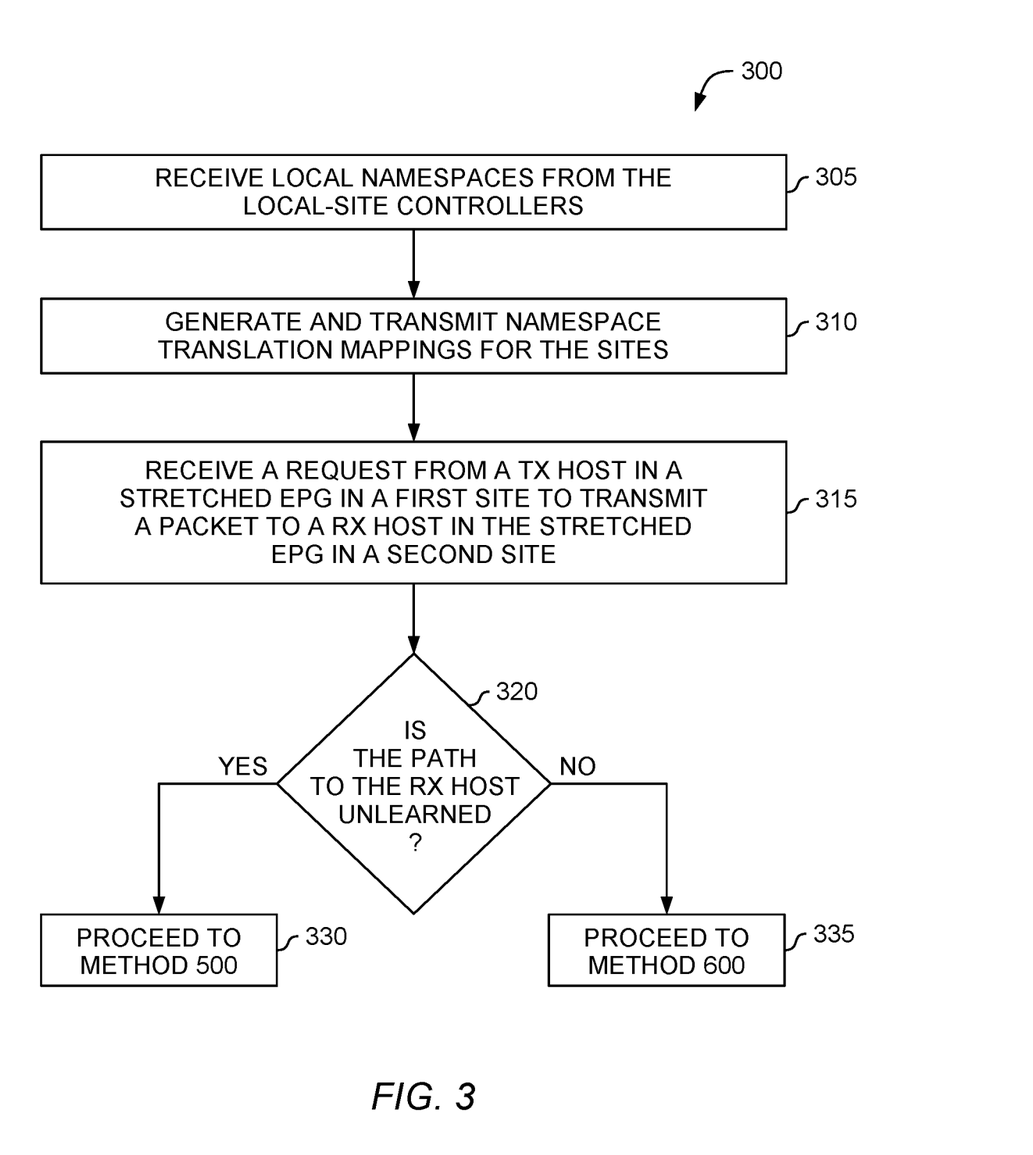
FIG. 3 is a flowchart for communicating between hosts at different sites belonging to a stretched endpoint group, according to one embodiment described herein.

FIG. 3 is a flowchart of a method 300 for communicating between hosts belonging to the same endpoint group but different sites, according to one embodiment described herein. At block 305, the multi-site controller receives local namespaces from the local-site controllers. That is, in response to a request (e.g., a config push action) from the multi-site controller or at predefined events (e.g., when the namespace is first established or when the namespace is updated), the local-site controllers transmit the namespace assignments to the multi-site controller. That is, the local-site controllers can be polled by the multi-site controller. As mentioned above, the local-site controllers may use the same range of values (e.g., the same range of IP addresses, security indexes, or network segment indexes) when establishing their respective namespaces. As such, the values may conflict—i.e., the same value may be used to name objects in multiple sites. For example, the same IP address may be assigned to a BD in Site 1 and a BD in Site 2. These conflicts, if not resolved, can cause errors when routing packets or applying security policies between the sites in the unified fabric.

At block 310, the multi-site controller generates and transmits namespace translation mappings for the sites. That is, the multi-site controller uses the namespace values received from the local-site controller to effectively stretch the EPGs (and the BDs, VRF instances, and tenant infrastructure) across two or more of the sites. For example, referring to the example in FIG. 2, the local-site controller for Site 1 may have named the VRF instance 210 VRF VNID X (where VNID is a source identifier) but the local-site controller for Site 2 may have named its VRF instance 210 VRF VNID A. Because these two separate objects should be stretched and treated as the same VRF instance 210, the multi-site controller provides a namespace translation mapping for Site 1 that indicates a received packet that has VRF VNID A should be translated to VRF VNID X. The multi-site controller also provides a namespace translation mapping for Site 2 that indicates a received packet that has a VRF VNID X should be translated to VRF VNID A. In this manner, the different (and potentially conflicting) namespace values used by Site 1 and Site 2 can be reconciled so that the VRF instances in the two sites are effectively a single stretched VRF instance 210 as shown in FIG. 2.

The multi-site controller can use a similar process to establish the namespace translation mapping for the other objects in the sites such as the EPGs. For example, the local-site controller in Site 1 may assign the Web-EPG 220 in FIG. 2 a Class ID of "Z" but the local-site controller in Site 2 assigns the Web-EPG 220 a Class ID of "C". In response, the multi-site controller can provide a namespace translation mapping for Site 1 that any packet received from Site 2 with a Class ID of C should be translated to Z and for Site 2 that any packet received from Site 1 with a Class ID of Z should be translated to C. In this manner, the multi-site controller can provide a namespace translation mapping so that depending on the site that transmitted the packet, the receiving site can convert the Class ID in that packet to a corresponding Class ID (assuming the EPG is stretched between the two sites).

Figure 4:
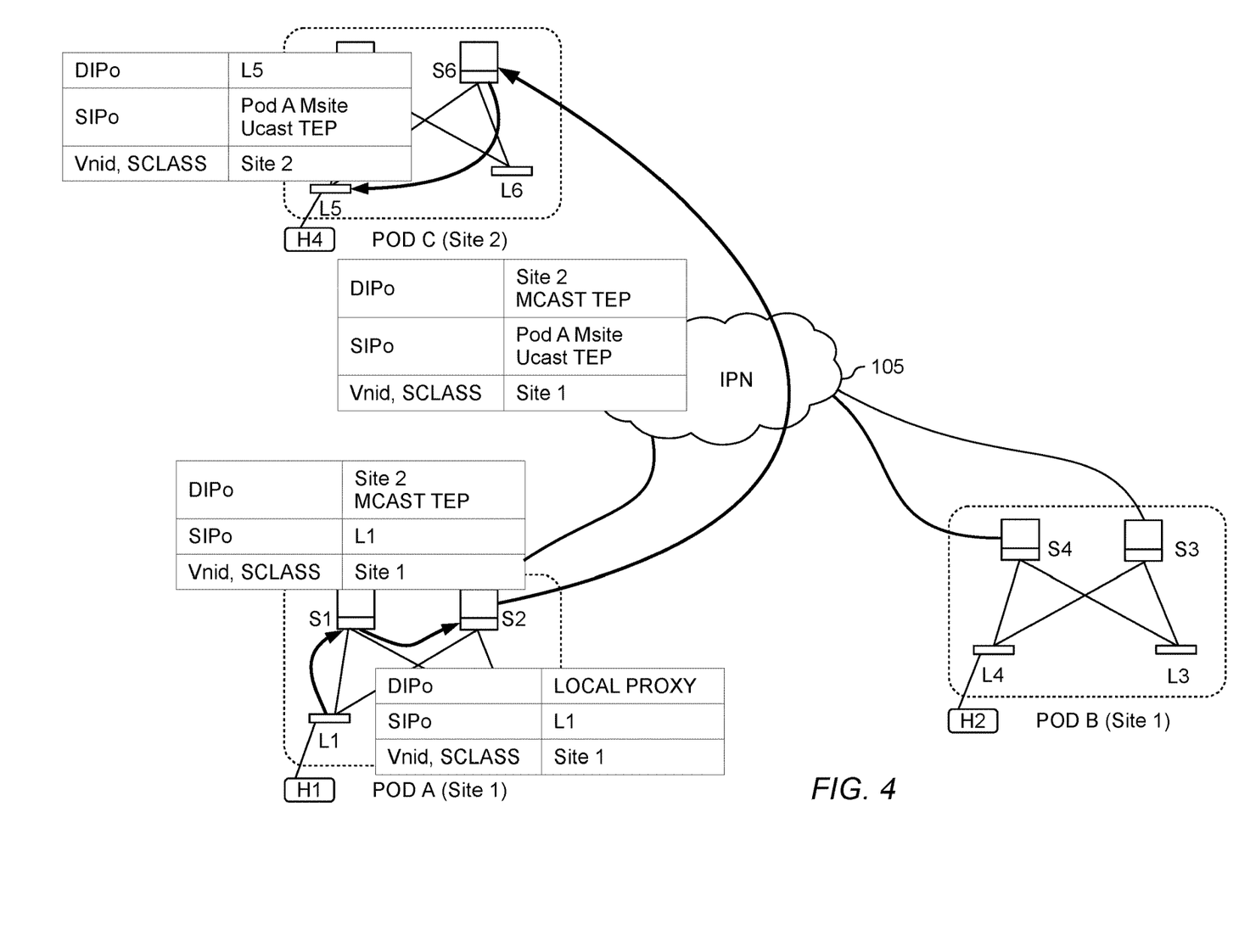
FIG. 4 is a flowchart for communicating between hosts at different sites using an unlearned path, according to one embodiment described herein.

At block 315, a leaf switch in a first site receives a request from a transmitting host (e.g., a TX host) assigned to a stretched EPG to transmit a packet to a receiving host (e.g., a RX host) in a second site also assigned to the stretched EPG. For clarity, the blocks in the method 300 are discussed in tandem with FIG. 4 which illustrates a unified fabric 100 that includes multiple sites, according to one embodiment described herein. In FIG. 4, a Host H1 (e.g., the TX host) provides a packet to Leaf Switch L1 in Site 1 which should be routed to a Host H4 in Site 2. Moreover, FIG. 4 illustrates that each site can have multiple pods—e.g., Pod A and Pod B-which each include different groups of spine and leaf switches, but this is not a requirement.

At block 320, the leaf switch (e.g., Leaf Switch L1 in FIG. 4) determines whether the path to the RX host is unlearned. That is, if this is the first time the TX host H1 has asked the Leaf Switch L1 to transmit data to the RX Host H4, the Leaf Switch L1 does not yet have the routing data required to route the data to the RX Host H4 at Pod C of Site 2. If the path to the RX host has already been learned, the method 300 proceeds to block 335 where routing is performed according to method 600, but if not, the method 300 proceeds to block 330 which performs method 500 to learn the path between the TX and RX hosts.

Figure 5:
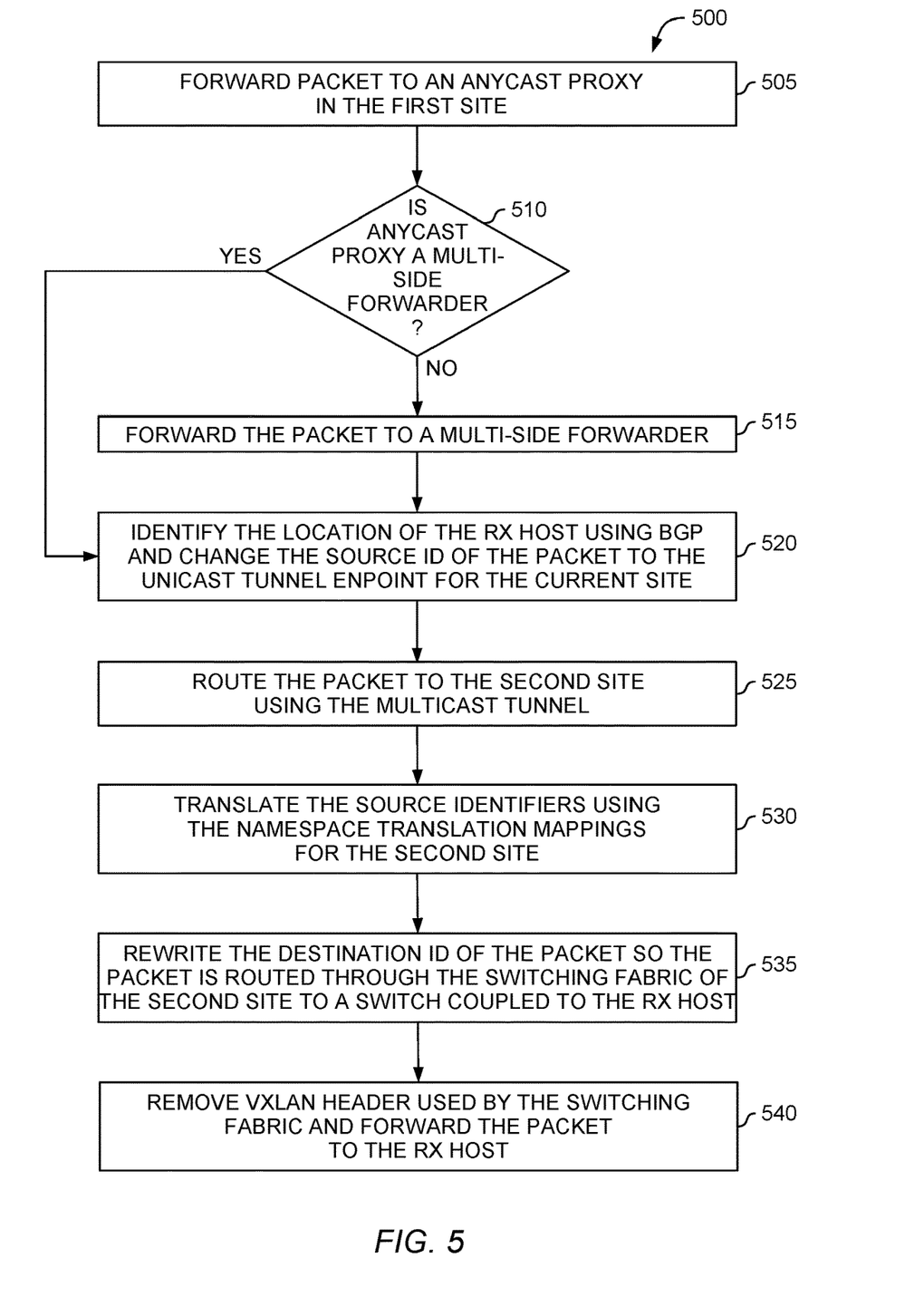
FIG. 5 illustrates a unified fabric including multiple sites, according to one embodiment described herein.

FIG. 5 is a flowchart of the method 500 for communicating between hosts at different sites using an unlearned path, according to one embodiment described herein. Put differently, the method 500 describes techniques for identifying a routing path between endpoints disposed at different sites that are assigned to the same stretched EPG. For clarity, the blocks in the method 500 are discussed in tandem with FIG. 4.

At block 505, the Leaf Switch L1 forwards the packet received from Host H1 to an anycast proxy in the first site. For example, the Leaf Switch L1 determines it does not know the route to the RX host and forwards the packet to a spine switch (e.g., Spine Switch S1) which can identify the route. Pod A can include any number of designated switches that can serve as an anycast proxy for identifying the routes between endpoints in the same stretched EPG but located in different sites.

At block 510, the anycast proxy determines whether it is a multi-site forwarder. That is, because the RX Host H4 is at a different site, the traffic may be routed through a designated multi-site forwarder at Site 1. Since in FIG. 4, the Spine Switch S1 is not a multi-site forwarder, at block 515, it forwards the packet to a multi-site forwarder—e.g., the Spine Switch S2. However, in another embodiment, all the spine switches may be designated multi-site fowarders, in which case, block 510 may be omitted. For example, all the spine switches may include the same look-up tables which mean it does not matter which spine switch receives the packet from the Leaf Switch L1.

At block 520, the multi-site forwarder identifies the location of the RX host using border gateway protocol (BGP) and changes the source ID of the packet to the unicast tunnel endpoint (TEP). In one embodiment, the multi-site forwarder performs BGP Ethernet Virtual Private Network (EVPN) to identify the location of the RX Host—e.g., that the RX Host H4 is in Site 2. However, in one embodiment, the forwarder may not know where in Site 2 (e.g., which Pod) the RX host is located. As such, the multi-site forwarder may use a multicast tunnel to forward the packet to Site 2—e.g., set the Destination ID header value (DIPo) to the multicast TEP for Site 2 as illustrated in FIG. 4. In one embodiment, the multicast tunnel enables the packet to reach all the pods of Site 2. The pods that do not have the RX host (e.g., any pods besides Pod C) drop the packet.

In addition, the multi-site forwarder changes the Source ID header value (SIPo) from the leaf switch L1 to the Ucast TEP for Pod A of Site 1. Doing so informs the receiving site where the packet came from so Site 2 knows the route back to the TX Host H1. That is, Site 2 does not know where the leaf switch L1 is, but it does not how to reach the Ucast TEP of Pod A at Site 1 (e.g., Spine Switch S2). In one embodiment, each Pod may have a unicast tunnel to each pod in all the other sites in the unified fabric. Thus, by using the Ucast TEP as the SIPo, the receiving site can know where to forward traffic that is destined for Host H1.

At block 525, the multi-site forwarder provides the packet to the public network 105 which routes the packet using the multicast tunnel to Site 2. As shown, in FIG. 4, the packet reaches the Spine Switch S6 which determines Pod C has the RX host for the packet.

As mentioned above, Site 1 and Site 2 may have private namespaces which have conflicts. As such, at block 530, the spine switch S6 translates the source identifiers (e.g., VNIDs and Class IDs) using the namespace translation mapping for the second site which was provided by the multi-site controller at block 310 of the method 300. That is, the spine switch S6 converts the values of the source identifiers in the packet corresponding to the private namespace of Site 1 to the values of those same source identifiers in the private namespace of Site 2. Using the examples above, the VNID of the VRF may be converted from X to A and the Class ID of the EPG from Z to C. Because the packet is part of a VRF and EPG that are stretched between Site 1 and Site 2 (although the BDs may be different), the spine switch S6 uses the namespace translation mappings to convert source identifiers of the VRF and EPG to the values used in the namespace of Site 2 from the source identifiers used in the namespace of Site 1. In this manner, the namespace translation mappings enable the unified fabric 100 to stretch the VRF and EPG between multiple sites as illustrated in FIG. 2.

At block 535, the spine switch S6 rewrites the destination ID (e.g., DIPo) of the packet so the packet is routed through the switching fabric of the second site to a switch coupled to the RX host. As shown in FIG. 4, the Spine Switch S6 determines that the Leaf Switch L5 is coupled to the RX Host H4, and changes the destination ID to Leaf Switch L5.

At block 540, the Leaf Switch L5 removes the VXLAN header used by the switching fabric in Site 2 to route the packet and forwards the packet to the RX host. Moreover, because the SIPo of the packet includes the Ucast TEP for Pod A of Site 1, the Leaf Switch L5 knows how to reach the TX Host H1. Thus, performing the method 400 not only enables the transmitting site (e.g., Site 1) to learn the path to the RX Host H4, it also enables the receiving site (e.g., Site 2) learn the path to the TX Host H1. Thus, if the Host H4 provides packets to the Leaf Switch L5 destined to the Host H1, the switch already knows the path to reach Host H1 (using the Uncast TEP of Pod A), and thus, does not need to learn the path. As such, performing the method 400 can establish learned paths for transmitting and received data between two endpoints in the same stretched EPG but different physical sites.

Figure 6:
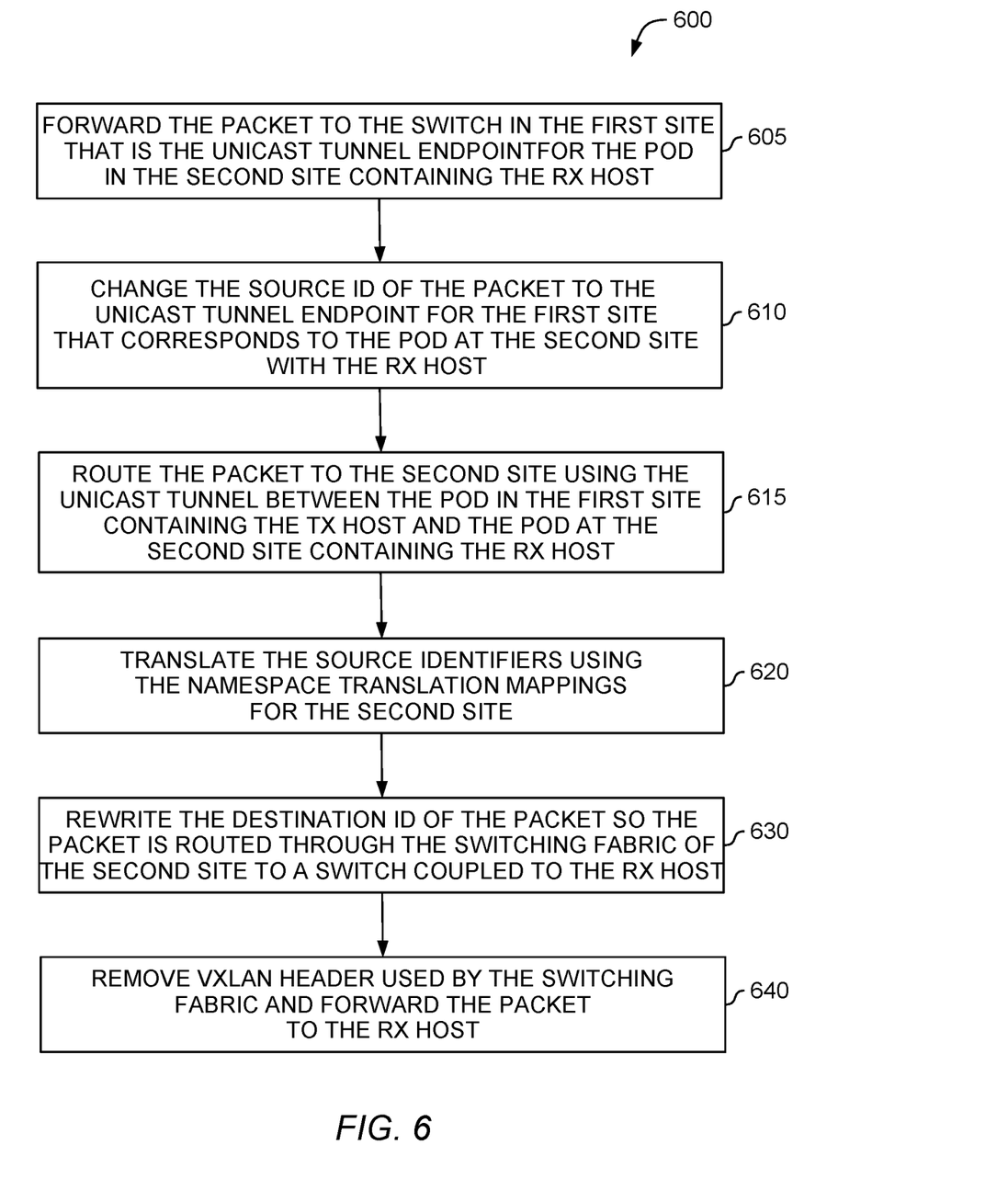
FIG. 6 is a flowchart for communicating between hosts at different sites using a learned path, according to one embodiment described herein.

FIG. 6 is a flowchart of a method 600 for communicating between hosts at different sites using a learned path, according to one embodiment described herein. That is, method 600 assumes that the path between two endpoints in different sites but in the same stretched EPG has already been learned using, e.g., the method 500. For clarity, the blocks in the method 600 are discussed in tandem with FIG. 7 which illustrates a unified fabric that includes multiple sites, according to one embodiment described herein.

Figure 7:
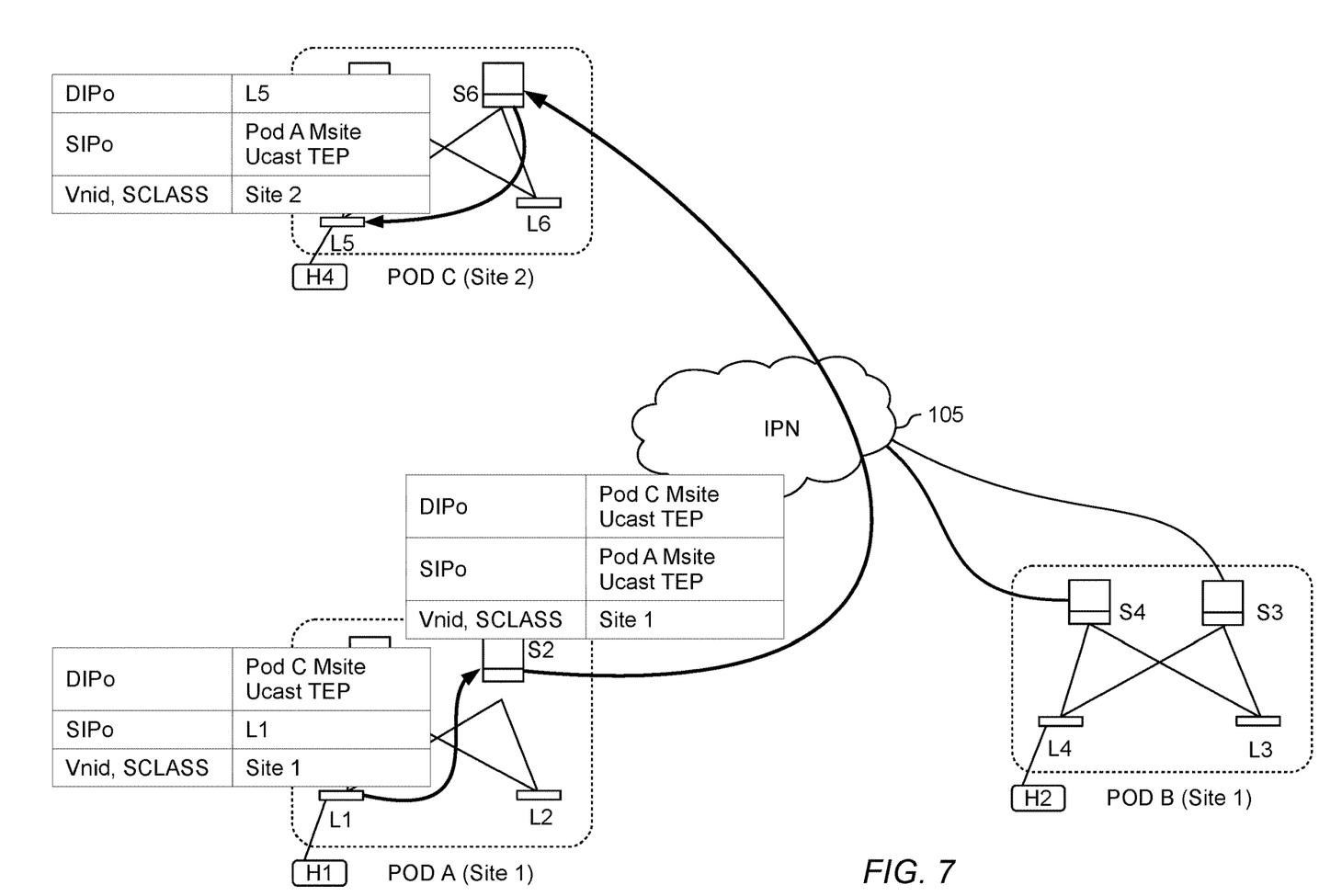
FIG. 7 illustrates a unified fabric that includes multiple sites, according to one embodiment described herein.

At block 605, a leaf switch forwards a received packet (e.g., a packet received from the TX Host H1) to the switch in Site 1 that is the unicast tunnel endpoint for the pod in Site 2 containing the RX host. For example, the Leaf Switch L1 transmits the packet to the spine switch that serves as one endpoint for the unicast tunnel between Pod A in Site 1 and Pod C in Site 2. As mentioned above, in one embodiment, each pod in the unified fabric includes a unicast tunnel to each pod in all the other sites.

Because the path has already been learned, the Leaf Switch L1 can change the destination ID to the multi-site unicast TEP for Pod C. For example, after performing BGP at block 520 of method 500 to identify the location of the RX host (e.g., Site 2), this information can be used to update the routing tables in the Leaf Switch L1 so that the next time the TX Host H1 sends a packet destined for RX Host H4, the Leaf Switch L1 knows the destination ID—i.e., the unicast TEP for Pod C.

At block 610, the Spine Switch S2 changes the source ID of the packet to the unicast tunnel endpoint for Site 1 that corresponds to the pod at Site 2 with the RX host. That is, the spine switch S2 changes the SIPo to the unicast TEP for Pod A (which is the address for spine switch S6) rather than the Leaf Switch L1.

At block 615, the public network 105 routes the packet to Site 2 using the unicast tunnel between Pod A in Site 1 and Pod C in Site 2. In contrast, when learning the path, the Spine Switch S2 may use a multicast tunnel to transmit the data to Site 2. Now that the path has been learned, Pod A and Pod C can use the unicast tunnel to transmit data packets between endpoints in the same stretched EPG.

Blocks 620 and 625 are similar to blocks 535 and 540 in the method 500, respectively, and thus are not described in detail here.

Figure 8:
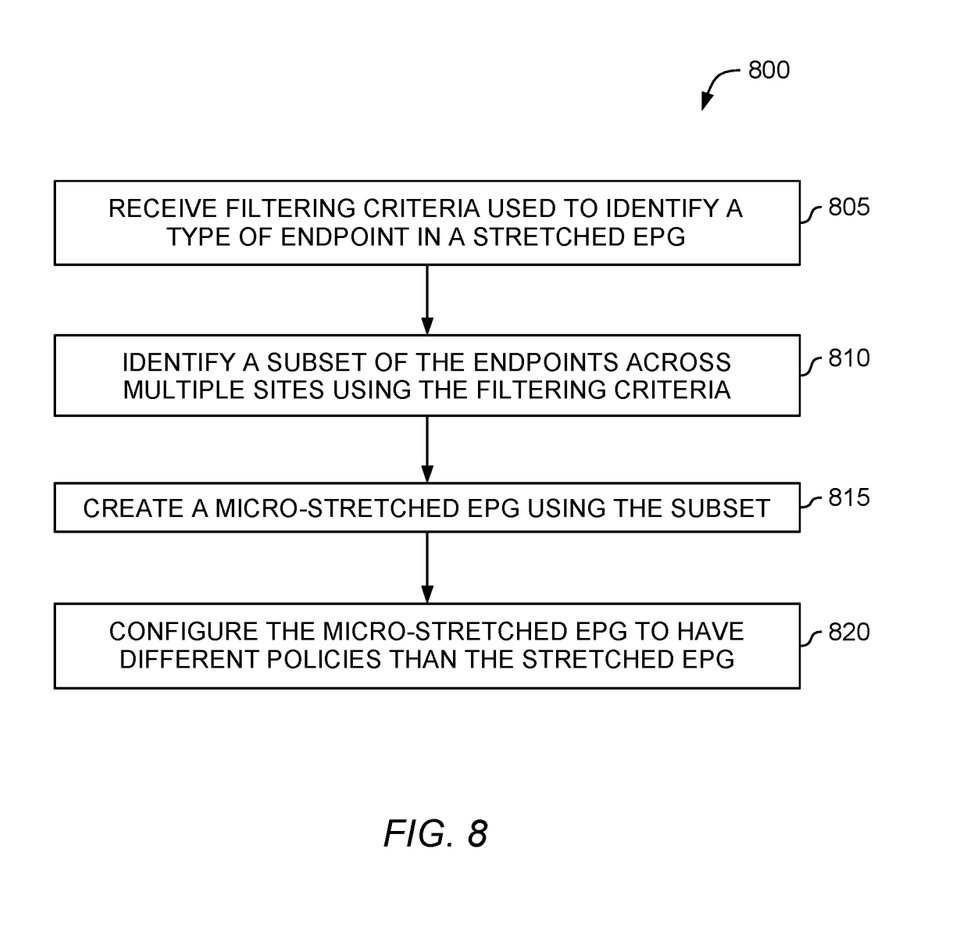
FIG. 8 is a flowchart for micro-segmenting a stretched EPG, according to one embodiment described herein.

FIG. 8 is a flowchart of a method 800 for micro-segmenting a stretched EPG, according to one embodiment described herein. The method 800 assumes that at least one stretched EPG has been established in the unified fabric as illustrated in FIG. 2.

At block 805, the multi-site controller receives a filtering criteria used to identify a type of endpoint in the stretched EPG. As mentioned above, an EPG can include different types of endpoints (e.g., hosts, applications, virtual machines, hypervisors, containers, physical servers, etc.). The filtering criteria can identify a particular type or subset of the endpoints which share the criteria. For example, the filtering criteria could include a virtual machine executing a particular type of operating system, a particular type of hypervisor, or an application or server sold by a particular vendor. In another embodiment, the filtering criteria could be particular range of MAC addresses or IP addresses.

At block 810, the multi-site controller identifies a subset of the endpoints across multiple sites using the filtering criteria. That is, the multi-site controller parses through the endpoints in the stretched EPG and identifies the endpoints that have, or satisfy, the filtering criteria. For example, the filtering criteria can be used to identify the web applications or servers in the stretch EPG that are exposed to the outside world (e.g., receive and service requests from external users or customers). These web applications may have the largest security concerns, and as such, the system administrator may wish to apply special security policies to these endpoints which are not applied to the other endpoints in the stretched EPG.

At block 815, the multi-site controller creates a micro-stretched EPG using the subset of endpoints identified at block 810. That is, these endpoints are removed from the original stretched EPG and placed in a smaller (micro) EPG. The EPG is still a stretched EPG if the identified endpoints are located at different sites in the unified fabric.

At block 820, the multi-site controller configures the micro-stretched EPG to have different policies than the stretched EPG. That is, now that the endpoints are in a separate EPG, they can have a different security policy, Quality of Service (QoS), service chain policy, and routing policy than the endpoints in the original stretched EPG. This provides additional flexibility to the system administrator to identify particular endpoints using the filtering criteria and establish a new micro EPG customized with policies best suited for those endpoints.

Figure 9:
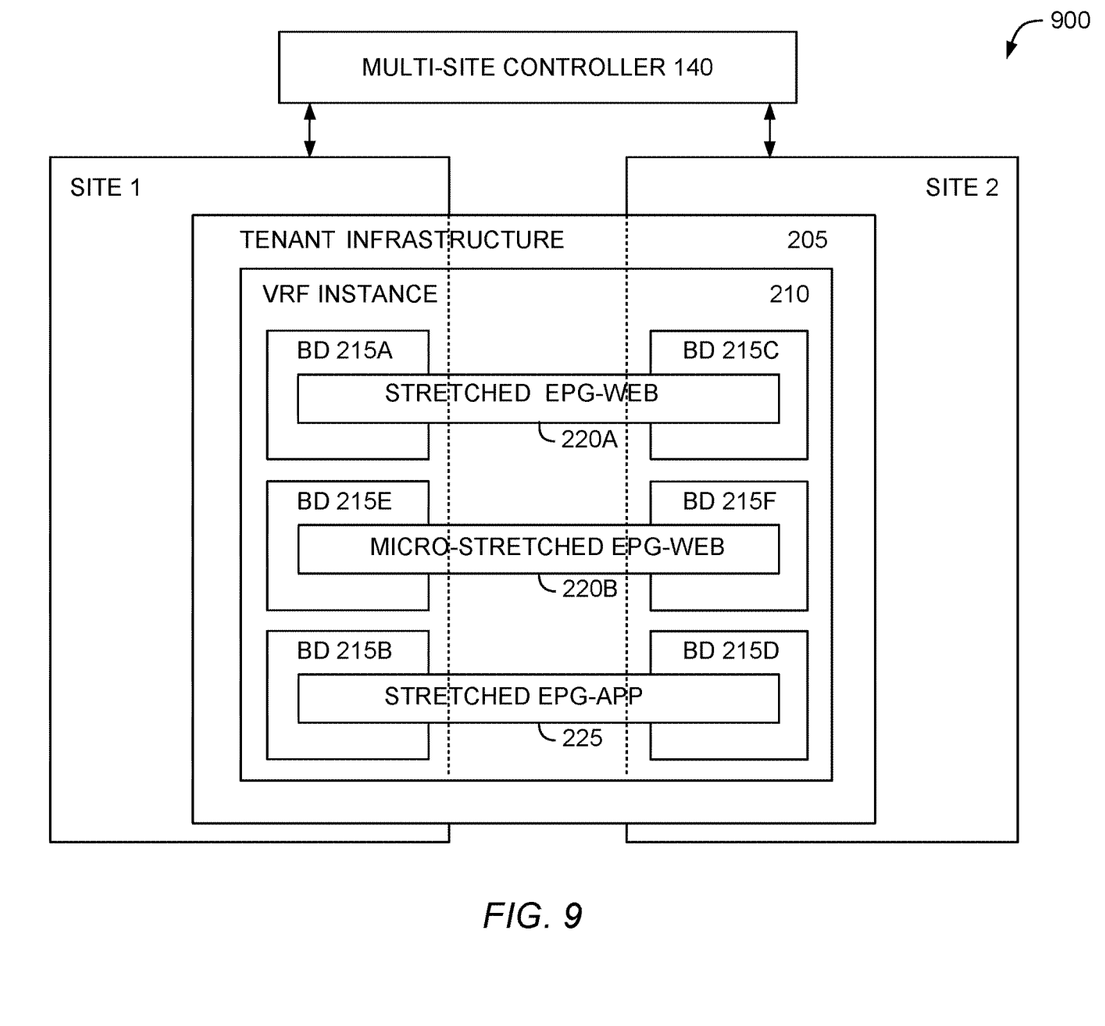
FIG. 9 illustrates a micro-stretched EPG, according to one embodiment described herein.

FIG. 9 illustrates a micro-stretched EPG in a unified fabric 900, according to one embodiment described herein. FIG. 9 is similar to the unified fabric 100 illustrated in FIG. 2 expect that two new BDs have been added (BD 215E and 215F) as well as the micro-stretched Web EPG 220B. In one embodiment, the method 800 is used to identify a subset of the endpoints that were originally in the stretched Web EPG 220A that are then removed and assigned to the micro-stretched Web EPG 220B. As such, the endpoints in the micro-stretched Web EPG 220B can have a completely different security policy, Quality of Service (QoS), service chain policy, and routing policy than the endpoints in the stretched Web EPG 220A. For example, the system administrator may establish a more stringent security policy for the endpoints in the micro-stretched Web EPG 220B and create a firewall that protects these endpoints.

Although not shown, the multi-site controller 140 can establish security contracts or policies which still permit the endpoints in the stretched Web-EPG 220A to communicate with the endpoints in the micro-stretched Web-EPG 220B. Thus, if these endpoints were previously working together to perform a service or function, the multi-site controller 140 can use security contracts to ensure that the endpoints in the two separate EPGs continue to provide that service or function. In this manner, although the endpoints are in separate EPGs and have separate security policies, the multi-site controller 140 can use security contracts to permit the endpoints to work together to perform a common service or function.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A system comprising:
a first switching fabric at a first site including a first plurality of endpoints, communicatively coupled via a network to a second switching fabric at a second site including a second plurality of endpoints, wherein the first site is at a different geographic location than the second site, a multi-site controller communicably connected with the first site and the second site;
wherein the multi-site controller is configured to:
define a Virtual Routing and Forwarding (VRF) domain extending between the first and second sites enabling communication between a group of endpoints including multiple endpoints at the first site and multiple endpoints at the second site;
identify at least a subset of endpoints within the group of endpoints using one or more filtering criteria, wherein the subset of endpoints includes at least one endpoint at the first site and at least one endpoint at the second site;
apply a shared security policy to the subset of endpoints; and
define a second VRF domain extending between the first and second sites enabling communication between a second group of endpoints including at least one endpoint at the first site and at least one endpoint at the second site, wherein the system selectively allows communication between endpoints connected via the VRF domain and endpoints connected via the second VRF domain.

2. The system of claim 1 wherein two different security policies apply to the group of endpoints and the subset of endpoints.

3. The system of claim 1 wherein the system is further configured to learn a path between endpoints at the first site and endpoints at the second site.

4. The system of claim 1 wherein the first switching fabric is configured to:
identify a location of a second endpoint at the second site by performing border gateway protocol (BGP) at a first switch in the first switching fabric, wherein the first switch is a unicast tunnel endpoint for the first site.

5. The system of claim 1 wherein the second switching fabric is configured to:
rewrite a destination header value in a packet to a first switch in the second switching fabric coupled to a second endpoint at the second site.

6. A system comprising:
a first switching fabric at a first site including a first plurality of endpoints, communicatively coupled via a network to a second switching fabric at a second site including a second plurality of endpoints, wherein the first site is at a different geographic location than the second site,
a multi-site controller communicably connected with the first site and the second site;
wherein the multi-site controller is configured to:
define, using a first VRF domain, a first group of endpoints including multiple endpoints at the first site and multiple endpoints at the second site;
identify a first subset of endpoints within the first group of endpoints using one or more filtering criteria, wherein the first subset of endpoints includes at least one endpoint at the first site and at least one endpoint at the second site;
apply a first shared security policy to the first subset of endpoints; and
define, using a second VRF domain, a second group of endpoints including at least one endpoint at the first site and at least one endpoint at the second site, wherein the system selectively allows communication between endpoints connected via the first VRF domain and endpoints connected via the second VRF domain.

7. The system of claim 6 wherein two different security policies apply to the first group of endpoints and the first subset of endpoints.

8. The system of claim 6 wherein the system is further configured to learn a path between endpoints at the first site and endpoints at the second site.

9. The system of claim 6 wherein the multi-site controller is configured to:
identify a second subset of endpoints within the first group of endpoints using one or more filtering criteria, wherein the second subset of endpoints includes at least one endpoint at the first site and at least one endpoint at the second site.

10. The system of claim 9 wherein a second shared security policy applies to the second subset of endpoints.

11. A system comprising:
a first switching fabric at a first site including a first plurality of endpoints, communicatively coupled via a network to a second switching fabric at a second site including a second plurality of endpoints, wherein the first site is at a different geographic location than the second site;
an identified first group of endpoints including multiple endpoints at the first site and multiple endpoints at the second site, wherein a first VRF domain enables communication between the identified first group of endpoints;
a first filter that identifies a first microsegment of the identified first group of endpoints based on host or application markers,
wherein the first microsegment includes at least one endpoint at the first site and at least one endpoint at the second site;
a first security policy that applies to communication to and from endpoints within the first microsegment; and
an identified second group of endpoints including multiple endpoints at the first site and multiple endpoints at the second site, wherein a second VRF domain enables communication between the identified second group of endpoints, wherein the system selectively allows communication between endpoints connected via the first VRF domain and endpoints connected via the second VRF domain.

12. The system of claim 11 wherein a different security policy applies to endpoints within the identified first group of endpoints that are not within the first microsegment.

13. The system of claim 11 further comprising a second filter that identifies a second microsegment of the identified first group of endpoints based on host or application markers,
wherein the second microsegment includes at least one endpoint at the first site and at least one endpoint at the second site.

14. The system of claim 13 further comprising a second security policy that applies to communication to and from endpoints within the second microsegment.

* * * * *